(12) United States Patent
Mahy et al.

(10) Patent No.: US 8,482,797 B2
(45) Date of Patent: Jul. 9, 2013

(54) METHOD AND APPARATUS FOR CALCULATING METAMERIC COLORS

(75) Inventors: Marc Mahy, Wilsele (BE); Koen Vande Velde, Duffel (BE)

(73) Assignee: Agfa Graphics NV, Motsel (BE)

( * ) Notice: Subject to any disclaimer, the term of this patent is extended or adjusted under 35 U.S.C. 154(b) by 102 days.

(21) Appl. No.: 13/203,857

(22) PCT Filed: Mar. 2, 2010

(86) PCT No.: PCT/EP2010/052592
§ 371 (c)(1),
(2), (4) Date: Aug. 30, 2011

(87) PCT Pub. No.: WO2010/100129
PCT Pub. Date: Sep. 10, 2010

(65) Prior Publication Data
US 2011/0310415 A1    Dec. 22, 2011

Related U.S. Application Data

(60) Provisional application No. 61/158,757, filed on Mar. 10, 2009.

(30) Foreign Application Priority Data

Mar. 4, 2009  (EP) .................................... 09154269

(51) Int. Cl.
*G06F 15/00* (2006.01)
*G06K 15/00* (2006.01)
*G06K 9/00* (2006.01)

(52) U.S. Cl.
USPC ........................... 358/1.9; 358/1.16; 382/167

(58) Field of Classification Search
None
See application file for complete search history.

(56) References Cited

U.S. PATENT DOCUMENTS

| 8,330,991 B2 * | 12/2012 | Chin et al. ..................... 358/1.9 |
| 2005/0068550 A1 | 3/2005 | Braun |
| 2008/0232848 A1 | 9/2008 | Proper et al. |

FOREIGN PATENT DOCUMENTS

| EP | 1 211 885 A2 | 6/2002 |
| EP | 1 343 309 A2 | 9/2003 |
| WO | 2005/043884 A1 | 5/2005 |

OTHER PUBLICATIONS

Official Communication issued in International Patent Application No. PCT/EP2010/052592, mailed on Apr. 16, 2010.
Imai et al., "Comparative Study of Metrics for Spectral Match Quality", (online) 2002, pp. 492-496, XP002528090 First European Conference on Colour Graphics, Imaging, and Vision ISSN:9, URL: http://citeseerx.ist.psu.edu/viewdoc/download?doi=10.1.1.4.7966&rep=rep1&type=pdf>.

* cited by examiner

*Primary Examiner* — Barbara Reinier
(74) *Attorney, Agent, or Firm* — Keating & Bennett, LLP

(57) ABSTRACT

A method for creating a set of metameric printed color patches on a color printer enables visual assessment under a specific illuminant if the colors of a printed product have faded.

7 Claims, No Drawings

METHOD AND APPARATUS FOR CALCULATING METAMERIC COLORS

CROSS-REFERENCE TO RELATED APPLICATIONS

This application is a 371 National Stage Application of PCT/EP2010/052592, filed Mar. 2, 2010. This application claims the benefit of U.S. Provisional Application No. 61/158,757, filed Mar. 10, 2009, which is incorporated by reference herein in its entirety. In addition, this application claims the benefit of European Application No. 09154269.6, filed Mar. 4, 2009, which is also incorporated by reference herein in its entirety.

BACKGROUND OF THE INVENTION

1. Field of the Invention

The present invention relates to a method for the quality control of printed products. In particular the invention relates to a method for checking the color reproduction accuracy of a given printer in view of color fading.

2. Description of the Related Art

The invention relates to the field of image rendering by means of multidimensional color reproduction devices. The independent values with which the color device can be addressed are called colorants or inks. For purposes of generality, the physically achievable values for these colorants range from 0 to 100%. A color reproduction device with n colorants will be called a printer or an n-ink process.

A typical device we have in mind is a multidimensional color printer with n colorants such as a CMYK offset printing press, but the invention can also be applied to other color reproduction devices, including multi-primary color displays.

With colorant space is meant an n-dimensional space with n the number of independent variables with which the printer can be addressed. For the offset printing press the dimension of the space corresponds to the number of inks of the printer, which is usually four.

With color space is meant a space that represents a number of quantities of an object that characterize its color. In most practical situations, colors will be represented in a 3-dimensional space such as the CIE XYZ space. However, also other characteristics can be used such as multispectral values based on filters that are not necessarily a linear transformation of the color matching functions to represent color. A typical example is an m-dimensional space of which the axes correspond to densities.

To characterize the color of object colors, it is nowadays common to measure the reflectance curve instead of directly the color values. For emission colors, the spectral power distribution is recorded. To convert the spectral data to color values the viewing conditions have to be specified. The minimum set of viewing conditions commonly used are the Color Matching Functions (CMF) and the viewing illuminant. In Graphic Arts, the standard values for these viewing conditions are the CIE 2 degree standard observer and the standard D50 illuminant. The obtained color values are referred to as tristimulus values and they are considered as a unique specification of a color for the Human Visual System (HVS) of a standard observer. The conversion from spectral data to tristimulus values is obtained as follows:

$$X = 100 \frac{\int_{360}^{830} R(\lambda)I(\lambda)X(\lambda)d\lambda}{\int_{360}^{830} I(\lambda)Y(\lambda)d\lambda}$$

$$Y = 100 \frac{\int_{360}^{830} R(\lambda)I(\lambda)Y(\lambda)d\lambda}{\int_{360}^{830} I(\lambda)Y(\lambda)d\lambda}$$

$$Z = 100 \frac{\int_{360}^{830} R(\lambda)I(\lambda)Z(\lambda)d\lambda}{\int_{360}^{830} I(\lambda)Y(\lambda)d\lambda}$$

In which:
lambda is the wavelength, ranging theoretically from 360 to 830 nanometers and wherein:
R(lambda) is the reflectance curve
I(lambda) is the power spectrum of the illuminant
X(lambda), Y(lambda) and Z(lambda) are the color matching functions of the standard observer.

With colorant gamut or colorant domain is meant the delimited space in colorant space of colorant combinations that are physically realizable by a given printer, taking into account possible extra limitations on colorant combinations. The colorant gamut of a CMYK offset press for example is delimited by a linear condition that limits the sum of the four colorants (for example to 340%).

A printer model is a mathematical relation that expresses color values in function of colorants for a given printer. The variables for the colorants are denoted as $c_1, c_2, \ldots, c_n$ with n the dimension of the colorant space.

An n-ink process is completely characterized by its colorant gamut with a number of colorant limitations and the printer model. Because of this close relationship between an n-ink process and the printer model, the operations typical for a printer model are also defined for the n-ink process. With inverting an n-ink process is meant that the corresponding printer model is inverted. The transformation of an n-ink process to color space on the other hand is equivalent to transforming the corresponding colorant domain to color space by making use of the printer model.

With color gamut is meant a delimited region in color space, containing colors that are physically realizable by a given printer, taking into account possible extra limitations on colorant combinations.

Metameric color patches are colors that have a different spectral characterization but the same color values. Typically we think about surface colors with different reflectance spectra but the same XYZ values for a given set of viewing conditions. In a similar way, for multi-primary color displays, i.e. color displays with more than three primaries, metameric colors can be generated.

Color Checks

To check the color reproduction behavior of a printer, typically a number of color patches are printed and measured, and compared with reference values. If the color difference is too large, it is recommended to recalibrate the system. If this does not help, the printer should also be characterized again.

The main problem with checking the state of the printer by printing and measuring a number of color patches is that mismatches are not found easily. A spectro-photometer or colorimeter is needed and an application has to be used to calculate the color differences.

However, if a color mismatch is caused by a difference between the real viewing conditions and the viewing conditions for which a color match was calculated, such a mismatch will not be detected by printing and measuring a number of color patches using standard procedures, because these always assume standard viewing conditions.

And finally, if only the viewing conditions have to be checked, dedicated strips can be bought indicating if an illuminant is still behaving as a predefined standard. However, as these strips are typically made to check if an illuminant id D50 like, they cannot be used to check the stability of custom illuminants.

SUMMARY OF THE INVENTION

According to a preferred embodiment of the current invention, color patches are designed to check different aspects of the color reproduction process.

It is one object of the invention to check if the print is well made; i.e. to check if all color reproduction steps including calibration, characterization, viewing illuminant are accurate.

It is another object of the invention to check if the real viewing illuminant corresponds with the viewing illuminant for which a color match is made.

It is another object of the invention to check if the spectral power distribution of the real viewing illuminant has not changed over time.

It is another object of the invention to check if a print has not shifted in color over time.

These objects and other objects of the invention are realized by a method as specified below. Specific embodiments are also found below.

The basic idea is to enable an operator to check the whole color reproduction flow or parts of it based on the visual assessment of a number of color patches. If the color reproduction process is accurate, the visually assessed color of a number of patches should match. If the colors don't match one or multiple steps in the color reproduction flow are not correct.

Object colors are reproduced by means of a color transform for visual evaluation under a specific viewing illuminant. One of the most difficult elements to check is if the real illuminant corresponds with the viewing illuminant for which a color transform is made or to check if the viewing illuminant has not changed over time.

To check the possible mismatch of the viewing illuminant, a number of patches can be made that have the same color for the specific viewing illuminant for which the color transform is determined, but have a different color if the viewing illuminant changes or if another illuminant is used. These colors are referred to as metameric colors for a specific viewing illuminant. Metameric patches are typically created with an output device with more than three inks. As multiple inks are available, there are always ink combinations available resulting in the same color for a given viewing illuminant. By just checking these patches visually under the used viewing illuminant, a match with the viewing illuminant used in the color match and the real viewing illuminant can be evaluated.

If a match is obtained after a print is made, it can be concluded that the print is well made and evaluated under the proper illuminant. This can be indicated on the print, and hence if the print is evaluated later on, color differences between the metameric patches can only be due to color fading or the usage of a wrong viewing illuminant. To check the illuminant, a fresh set of metameric patches can be printed and evaluated under the given illuminant.

DETAILED DESCRIPTION OF THE PREFERRED EMBODIMENTS

The color characteristics of most color reproduction devices change over time, for example due to different printing conditions, different drivers, different inks and media used.

To check the color reproduction accuracy of the printer, a number of color patches are printed with known color values, specified by their CIELAB coordinates, XYZ values or—in advanced applications—their reflectance characteristics. The printed color patches can be measured and the measurements compared with the specified color values. This is an accurate technique, but it is rather cumbersome. It requires the use of a colorimeter or spectro-photometer and the specified color values have to be made available each time the print is checked.

In a number of circumstances, it is much easier for a customer to check the color accuracy of a print by evaluating color patches visually. As the Human Visual System (HVS) can be seen as an accurate zero detector for color differences, e.g. think about the crispening effect for small lightness differences, color patches that match for a given set of printing conditions and viewing conditions can be used.

This is definitely a possible approach as printing devices all make color with the overlap between multiple inks. In most cases more than three inks are used so that many printers have the capability to generate metameric colors. A CMYK printer for example will have a multiple of CMYK combinations to simulate a given CIELAB color, i.e. there is a match for a given set of color matching functions and viewing illuminant, however if either the viewing illuminant or color matching functions are changed there is no guarantee to have a match anymore.

Creation of Metameric Color Matches

To characterize the color reproduction process of an output device, a printer model is used that transforms stimulus values into color values. If the dimensionality of the stimulus space is smaller than or equal to three, for in gamut colors it is assumed that there is a one to one mapping between stimulus values and color values. In special cases, if the printer model is non-degenerate, there might be a finite number of stimulus values that map to the same color values. If the dimensionality of the stimulus space is larger than three, there will be an infinite number of stimulus combinations that result in the same color values as they are assumed to be 3-dimensional in nature. All these stimulus combinations result in metameric color matches as they will have the same color but different spectral characteristics. It is known, for example that the same neutral color can be rendered with multiple combinations of CMYK ink amounts.

As the color values are based on a specific set of color matching functions and a specific viewing illuminant, a set of predicted metameric pairs will only match if
　these viewing conditions are met;
　the printer settings such as the printer driver, calibration settings, screening, inks, drying time and medium are the same as those for which the printer model is made.

If a set of metameric colors don't match visually, at least one of the above mentioned parameters are not set properly and hence the print is not valid for the given print and viewing conditions.

A typical application in which the accuracy of the printer is crucial is contract proofing. Customers expect for contract proofing an average deltaE* of zero. In reality, average deltaE* values as low as 0.4 to 0.5 can be obtained for a number of color patches, which is considered residual error due to be mainly measurement and printer noise.

Nowadays, it is common to characterize the color reproduction process of a color reproduction device by a profile. In most cases ICC profiles are used. These profiles contain several sets of information about the color reproduction device, including color conversions from the colorant space of the device to color space and vice versa.

The ICC profile can be considered as the most logical container for a color reproduction device of all aspects of its color characterization process. Hence, it also contains all information that is needed to generate metameric color patches; i.e. the viewing conditions for which the profile is intended and spectral measurement data (i.e. spectral reflectance values for different colorant combinations).

As the accuracy of the printer model has to be quite high, printer models based on printer targets such as the IT8.7/3 or the IS12642/2 target are in general not accurate enough. To increase the accuracy of the printer, the closed loop approach is used for a number of a selected number of colorant combinations. However, these starting colorant combinations are first looked for based on a less accurate printer model.

Creation of Optimal Metameric Colors for CMYK Printers to Check the Viewing Illuminant First two illuminants are selected, a first illuminant for which the color patches are the same, and a second illuminant for which the color patches shall have a color difference as large as possible.

In a first step, both a printer model from CMYK to XYZ and from CMYK to spectral space are created based on a standard printer target such as the IT8.7/3 target or the ISO 12642/2 target. The first illuminant is used to create the XYZ model.

Optimal metameric patches are obtained by a method using the following steps:
  a. For the XYZ model, a set of CMYK values are taken in the colorant gamut and converted into the XYZ space.
  b. For each obtained XYZ color, the XYZ model is inverted; i.e. all possible CMYK combinations resulting in the given XYZ color is looked for. If there are multiple possibilities, the CMYK combinations are converted into their corresponding spectra by making use of the spectral model. In a next step the spectral curves are converted into CIELAB values according the second illuminant; and the CIELAB lab values are looked for that have the largest deltaE.
  c. This process is repeated over all XYZ colors and the color stimuli resulting in the largest deltaE per XYZ color is retained as optimal metameric colors for the specified illuminants.

As the optimal metameric colors are different for different illuminant combinations, it is advantageous to print multiple optimal metameric color patches corresponding to different illuminant combinations.

For all optimal metameric color patches to be printed, closed loop iterations should be used to improve the printer accuracy in these parts of the colorant space. An extensive explanation of closed loop iterations is provided in the European patent application with publication number EP 1 596 576, authored by Marc Mahy and Koen Vande Velde, and assigned to Agfa-Graphics NV.

In summary, closed loop iteration involves the following steps:
  a. Create a printer model based on all available measured color patches.
  b. Per colorant combination, determine one or multiple colorant combinations to be printed so that the printer model can be increased in accuracy in this region of the colorant space optimally.
  c. Print the just defined colorant combinations and measure them by preference spectrally.
  d. Add these measurements to the profile.
  e. Go to step a if the printer model still needs to be improved.

Creation of Optimal Metameric Colors for CMYK Printers to Check Ink Fading

In a first step, the fading characterization of the printer has to be recorded. Therefore, a printer target is printed and measured after several time intervals, according to the speed of the fading.

Then, an XYZ model is made, representing the normal color behavior of the printer on the one hand (let's refer to this model as XYZ model at T=0) and a second XYZ model is made to simulate the fading after some time (e.g. after a month, XYZ model at T=1 M).

To find a set of optimal metameric patches to test fading the following steps should be followed:
  a. For the XYZ model at T=0, a set of CMYK values are taken in the colorant gamut and converted into the XYZ space.
  b. For each obtained XYZ color, the XYZ model at T=0 is inverted; i.e. all possible CMYK combinations resulting in the given XYZ color is looked for. If there are multiple possibilities, the CMYK combinations are converted into their corresponding XYZ values by making use of the XYZ model at T=1 M. In a next step the XYZ values are converted into CIELAB values; and the two CIELAB values are looked for that have the largest deltaE.
  c. This process is repeated over all XYZ colors and the color stimuli resulting in the largest deltaE per XYZ color is retained as optimal metameric colors for the specified fading times.

For all optimal metameric color patches to be printed, closed loop iterations should be used to improve the printer accuracy of the XYZ model at T=0 in these parts of the colorant space.

Extending the Calculation of Metameric Patches for More Than 4 Ink Processes

The above methods for calculating metameric color patches can be used for printing processes that use four colorants such as CMYK, but also for printing processes that use more than four colorants. An example of such a printing process uses CMYK colorants and additionally one or more colorants out of the set of orange, green or blue colorants.

Embedding Metameric Color Patches in a Proofing Workflow

The creation of metameric color patches requires accurate printer models. To guarantee an optimal behavior of these models, tuning needs to be done on a regularly basis; i.e. by preference on a day by day basis, or in some cases on a week by week basis. As checking and updating printer models is rather time consuming, by preference color measurement equipment should be built into the printing devices so that these corrections and updates can be done preferably automatically whenever the device is not occupied.

Hence, the generation of metameric patches can be done generated automatically, on a regular basis. Also checking metameric patches can be done automatically; i.e. the patches can be measured to check if they really are metameric for a given illuminant. Also the CIELAB values for standard illuminants such as D50 can be provided and the corresponding values could be printed to check if they are still valid after some time. Checking color values with spectra-photometers is easily done for standard illuminants such as D50.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A method for selecting a metameric pair of first and second color patches having colorant values for the purpose of visually assessing fading of a printed product under a specific illuminant, the method comprising the steps of:
    (a) determining a fading model by printing a characterization target with a printer, measuring the characterization target under the specific illuminant at a first time T=0 and after a time interval at a second time T=1, and calculating corresponding first and second printer models;
    (b) selecting a first set of colorant values for the printer in a printer colorant space, the first set of colorant values corresponding with a first color patch;
    (b) converting the first set of colorant values into a first set of color coordinates in an XYZ color space using the first printer model;
    (c) converting the first set of color coordinates in the XYZ color space into multiple second sets of colorant values that are different from the first set of colorant values using an inverse of the first printer model;
    (d) converting the multiple second sets of colorant values into multiple second sets of color coordinates in the XYZ color space using the second printer model;
    (e) converting the first set of color coordinates in the XYZ color space into a first set of color values in a CIELAB color space and converting the multiple second sets of color coordinates in the XYZ color space into multiple second sets of color values in the CIELAB color space;
    (f) determining a difference between the first and second sets of color values in the CIELAB color space; and
    (g) selecting one of the second sets of colorant values that yields a maximum difference between the first and the second sets of color values in the CIELAB color space and that corresponds with a second color patch.

2. The method according to claim 1, wherein the first set of colorant values is selected within a colorant gamut so that the difference between the first and second sets of colorant values in the CIELAB color space is maximized.

3. The method according to claim 1, further comprising the step of printing the metameric pair of first and second color patches having the first set of colorant values and the selected second set of colorant values.

4. The method according to claim 2, further comprising the step of printing the metameric pair of first and second color patches having the first set of colorant values and the selected second set of colorant values.

5. The method according to claim 3, further comprising the step of visually assessing a color difference between the metameric pair of first and second color patches.

6. The method according to claim 4, further comprising the step of visually assessing a color difference between the metameric pair of first and second color patches.

7. A non-transitory digital data carrier comprising computer code instructions for carrying out, when the computer code instructions are run on a computer, the steps according to claim 1.

* * * * *